United States Patent [19]
Sommer

[11] Patent Number: 5,335,307
[45] Date of Patent: Aug. 2, 1994

[54] PRECISION ELECTRIC MOTOR SPEED

[76] Inventor: William F. Sommer, P.O. Box 163, LaGrange, Ga. 30241

[21] Appl. No.: 21,650

[22] Filed: Feb. 1, 1993

Related U.S. Application Data

[63] Continuation of Ser. No. 838,144, Feb. 18, 1992, abandoned.

[51] Int. Cl.[5] ............................................. H02P 5/165
[52] U.S. Cl. ................................... 388/814; 388/805; 318/807; 318/818
[58] Field of Search ............... 318/725, 807, 809, 811, 318/812, 814, 818, 822, 827, 828; 388/805, 814

[56]  References Cited

U.S. PATENT DOCUMENTS

| | | | |
|---|---|---|---|
| 3,644,813 | 2/1972 | Schoendorff | 318/569 |
| 4,590,928 | 9/1985 | Marhoefer | 318/685 |
| 4,763,057 | 8/1988 | Danz et al. | 318/809 |
| 4,823,055 | 4/1989 | Bowman | 388/818 |
| 5,013,990 | 5/1991 | Weber | 318/812 |
| 5,193,146 | 3/1993 | Kohno | 388/813 |

Primary Examiner—William M. Shoop, Jr.
Assistant Examiner—John W. Cabeca
Attorney, Agent, or Firm—Barbara Joan Haushalter

[57]  ABSTRACT

A system and method for controlling the speed of an electric motor compares the actual speed of the motor with the desired speed of the motor. A digital comparison of the desired speed of the electric motor with the actual speed of the electric motor provides an error signal indicative of the error between the desired speed and the actual speed. A large timing current from a programmed timing control will cause an increase in the speed of the motor, while a smaller timing current from the programmed timing control will cause a decrease in the speed of the motor. In this manner, the programmed timing control affects the actual speed of the motor 12 to approach the desired speed. The programmed timing control can also provide a ramping acceleration or deceleration as the motor speed changes to approach the desired speed. The speed control system can also include a programmed stall detector which can cause the operation of the electric motor to be ceased when a stalled motor condition is detected.

21 Claims, 2 Drawing Sheets

PRECISION ELECTRIC MOTOR SPEED

This is a continuation of application Ser. No. 07/838,144, filed Feb. 18, 1992 now abandoned.

BACKGROUND OF THE INVENTION

The present invention relates to electric motors and, more particularly, to controlling the speed of an electric motor.

Currently, electric motor speed controls employ a variety of electro-mechanical or expensive electronic techniques in an attempt to maintain a desired motor speed. Existing electro-mechanical motor speed control techniques do not provide the capability of detecting a stalled motor condition to remove the power to the motor to prevent personal injury or equipment damage. Also, existing electro-mechanical techniques for controlling motor speed are unable to precisely detect motor speed changes because response times of the mechanisms are inherently long.

Known electronic techniques for controlling motor speed either approximate the speed by use of a charged capacitor or by expensive pickup devices. While some of the present electronic motor speed controls monitor the current through the motor and remove the power at some predetermined current level, this does not allow a programmed time period for the motor to attempt to overcome the obstacle by increasing the power to the motor. In addition, low level current detection results in unwanted power interruptions.

The ability to control the increasing and decreasing rate of speed is also not available with the present techniques. This is a disadvantage in that it prevents the motor and the control from being integrated for maximum power efficiency and does not allow the motor's speed changes to be mated to the application. Some alternating current electric motor speed controls also have greatly unbalanced phase angles through positive and negative cycles. This creates a DC power component in the motor that is both inefficient and could cause motor damage. Finally, present alternating current electric motor speed controls lack a provision for eliminating brush bounce power loss when the thyristor is turned off too soon. Premature firing of the thyristor can also result in power loss if the inductive current, related to the voltage cycle, has not ceased when thyristor firing is attempted.

It is seen then that there exists a need for a technique for controlling an electric motor that overcomes the disadvantages encountered in current electric motor speed control systems.

SUMMARY OF THE INVENTION

A precision electric motor speed control employs electronic techniques for controlling an electric motor by the system according to the present invention. In the electric motor speed control of the present invention, the actual speed of the motor is detected by the use of an economical tachometer. A digital comparison of preferred or desired speed versus the actual motor speed provides error detection within millionths of a second. This error is translated into independently programmed increasing or decreasing timing current to allow for both maximum power efficiency and for the control to be mated to the speed change characteristics of the motor.

In accordance with one aspect of the present invention, a speed control for an electric motor comprises means for detecting the actual speed of the electric motor and digital comparison means for comparing the desired speed of the electric motor with the actual speed. The digital comparison provides an error signal indicative of the error between the desired speed and the actual speed. The speed control also comprises means for adjusting the actual speed of the electric motor to reduce the error signal.

Accordingly, it is an object of the present invention to provide an electronic technique for controlling the speed of an electric motor. It is a further object to provide such a technique in which a low cost control system provides precise speed regulation over a wide range of voltage, load, and temperature conditions. It is an advantage of the present invention that the speed of an electric motor may be modified to maintain a desired speed. Finally, it is an object of the present invention to provide such techniques which include brush bounce protection, and maximum efficiency for thyristor controlled alternating current electric motors.

Other objects and advantages of the invention will be apparent from the following description, the accompanying drawings and the appended claims.

DETAILED DESCRIPTION OF THE PREFERRED EMBODIMENTS

The present invention provides a system and method for controlling the speed of an electric motor which compares the actual speed of the motor with a simulation of the desired speed of the motor. A digital comparison of the desired speed of the electric motor with said actual speed of the electric motor provides an error signal indicative of the error between the desired speed and the actual speed. The actual speed of the electric motor is then adjusted to reduce the error signal. The means for adjusting the actual speed of the electric motor to reduce the error detected between the actual speed and the desired speed may also include a means for programming an adjustment rate.

Figure 1:
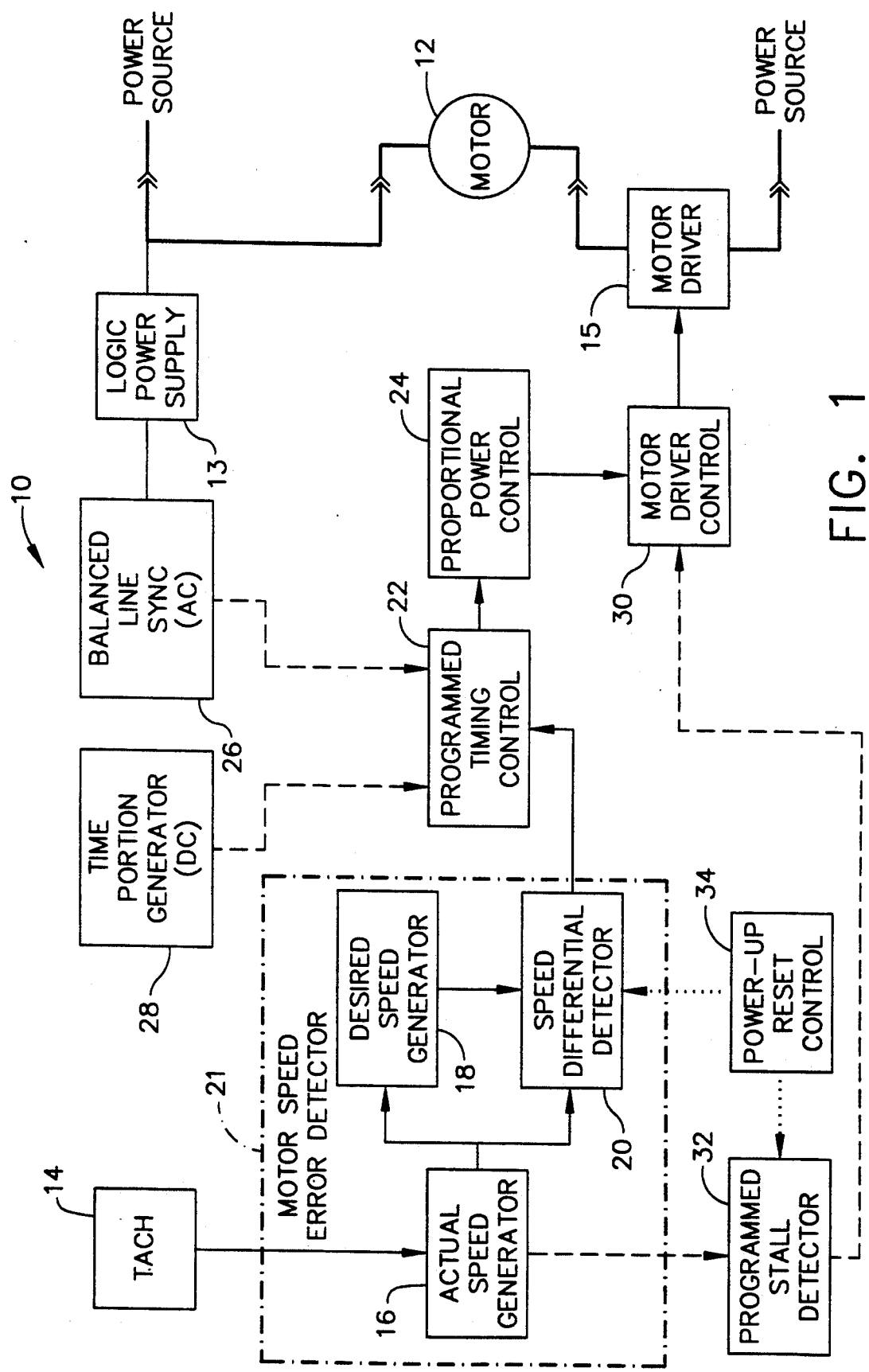
FIG. 1 is a block diagram of the precision electric motor speed control of the present invention.

Referring now to the drawings, in FIG. 1 there is illustrated a block diagram of an electric motor speed control 10 for controlling the speed of an electric motor 12. The motor 12 is powered by a power source and driven by a motor driver 15. A logic power supply 13 serves as a HIGH and LOW logic source. The logic power supply 13 can be any one of a variety of power supplies known to those skilled in the art. A digital indication of motor 12 movement, such as a tachometer 14, detects the actual speed of the electric motor 12 as it relates to the desired speed of the electric motor 12. The digital indication, or tachometer 14, determines the speed of the motor 12 by any suitable means including light, sound, air, or flux disturbance, or by electromechanical means.

Figure 2:
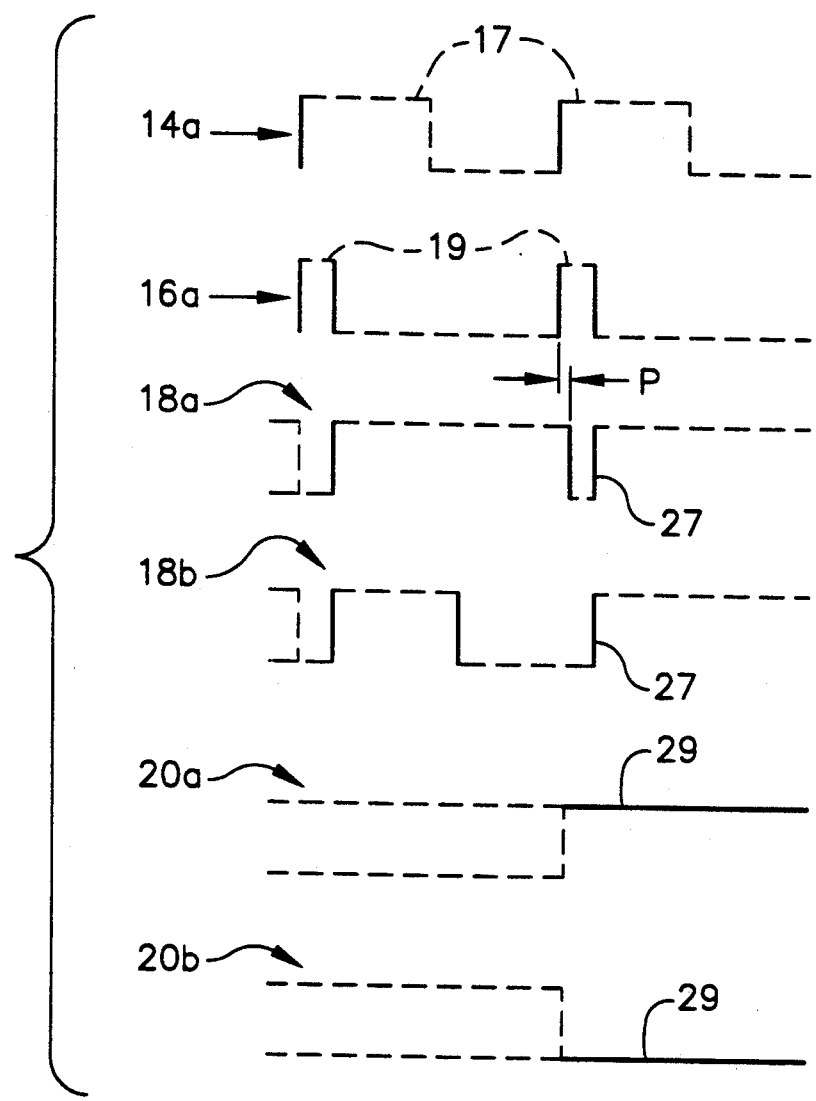
FIG. 2 is a timing diagram illustrating output pulses of some elements of FIG. 1.

Referring now to FIG. 2 and continuing with FIG. 1, the tachometer 14 provides an output 14a comprising tachometer generated pulses 17 indicative of the speed of motor 12 to an actual speed generator 16. The actual speed generator 16 utilizes the edge of each of the pulses 17 from the tachometer 14 to generate an output 16a comprising new specific width pulses 19, wherein each specific width pulse 19 has a leading edge 23 and a trailing edge 25. The time duration between the corresponding edges of each specific width pulse 19 is directly proportional to the actual speed of the motor 12. A desired speed generator 18 having an output 18a or 18b, receives the specific width pulses 19 from the actual speed generator 16 and utilizes the edges 23 and 25 of these pulses 19 to initiate and terminate secondary pulses 27. The full duration of these secondary pulses 27 is directly proportional to the desired speed of the motor 12. The specific width pulses 19 will shorten the duration of the secondary pulses 27 if the actual speed of the motor 12 is faster than the desired speed of the motor 12. Consequently, the relationship of the time between the specific width pulses 19 to the full duration of the secondary pulses 27, precisely determines if the speed of the motor 12 is faster as shown by output 18a of FIG. 2 or slower as shown by output 18b of FIG. 2 than desired.

Each secondary pulse 27 is commenced using the trailing edge 25 of the specific width pulse 19, and each secondary pulse 27 is terminated using the leading edge 23 of the specific width pulse 19. The leading edge 23 simultaneously attempts to turn a speed differential detector 20 on or off. This is possible due to the inherent propagation time P within an element, here the desired speed generator 18. The speed differential detector 20, having an output 20a or 20b, utilizes the specific width pulses 19 created by the actual speed generator 16 and the secondary pulses 27 created by the desired speed generator 18 to produce an error signal 29 indicative of the actual speed of the motor 12 as it relates to the desired speed. The logic state of the error signal produced by the speed differential detector 20 indicates that the motor 12 is running at a speed either faster as shown by output 20a of FIG. 2 or slower as shown by output 20b of FIG. 2 than the desired speed. The actual speed generator 16, the desired speed generator 18, and the speed differential detector 20 comprise a motor speed error detector 21.

A programmed timing control 22 interprets the logic states of the error signal 29 produced by the speed differential detector 20 and generates a timing current, or current signal, responsive thereto to affect the speed of the motor 12. The technique for causing the programmed timing control 22 to generate the timing current can be accomplished by a variety of electronic means known by those skilled in the art, including, by way of example only, a charge on a capacitor at the base of an NPN transistor connected in the emitter follower mode. The charge on the capacitor will be determined by diode directed bi-directional current flowing through programmed resistances between the speed differential detector 20 and the capacitor. In a preferred embodiment, a programmed minimum voltage can be produced in the LOW side of the capacitor, at a node of a resistance divider. This minimum voltage is reflected on the HIGH side of the capacitor, ensuring a desired minimum timing current, thereby preventing a delay in the motor 12 reaching its initial minimum speed. The HIGH side of the capacitor is connected to the base of an NPN transistor having its collector connected to the HIGH state and having a resistance in series with its emitter. The current through this emitter connected resistance will be proportional to the voltage on the capacitor, which is in turn proportional to the percentage of time that the motor 12 is driven by motor driver 15. Hence, a larger timing current from the programmed timing control 22 will cause an increase in the speed of the motor 12, while a smaller timing current from the programmed timing control 22 will cause a decrease in the speed of the motor 12. In this manner, the programmed timing control 22 affects the actual speed of the motor 12, causing the actual speed of the motor 12 to approach the desired speed. The programmed timing control 22 can also provide a ramping acceleration or deceleration as the motor 12 speed changes to approach the desired speed.

Continuing with FIG. 1, a proportional power control 24 converts the current signal determined from the timing current from the programmed timing control 22 into a proportion signal indicative of a time ratio during which power is to be applied to the electric motor 12. When the motor 12 is operating on alternating current, the time that is proportioned is preferably one half of the full cycle of the line voltage to the motor 12. When the motor 12 is operating on direct current, the time that is proportioned is preferably determined by a variety of factors, including the type of motor being controlled, the direct current supply to the motor, and the type of motor driver 15 utilized. In a preferred embodiment of the present invention, a balanced line sync 26 technique is employed for a motor 12 operating on alternating current, and a time portion generator 28 is used for a motor 12 operating on direct current. For either type of motor 12, the pulse width of the proportion signal from the proportional power control 24 will be the percentage of the time period required to apply power to the motor 12 to maintain the desired speed.

In the electric motor speed control 10, a motor driver control 30 receives the proportion signal from the proportional power control 24 and converts the proportion signal to a motor driver signal required by the motor driver 15 for driving the motor 12. The particular device or combination of devices used as the motor driver 15 depends on the application and the specific motor 12 utilized in that application. For example, the motor driver 15 is typically a thyristor for alternating current motors and a transistor for direct current motors. If the motor driver 15 is a thyristor, for example, the motor driver signal generated by the motor driver control 30 is a pulse train that provides the appropriate current pulses for the specified time as required by the thyristor employed. This pulse train would ensure that the thyristor is not only turned on at the appropriate time, but also that it will be re-turned on in the event it should be turned off by motor brush bounce. Another important feature of the pulse train technique is its ability to turn on the thyristor after its inherent lagging current has been allowed to diminish. This feature ensures that the motor will receive the maximum time on during the available power time period. Alternatively, if the motor driver 15 is a transistor, the motor driver signal generated by the motor driver control 30 is a current source of sufficient magnitude to meet the requirements of the transistor arrangement employed.

Continuing with FIG. 1, a programmed stall detector 32 monitors the specific width pulses on the actual speed generator 16 output, and if the pulses are not detected for a programmed period of time, produces a control signal to the motor driver control 30 to prevent the motor driver 15 from allowing the motor 12 to operate. After a stalled motor condition is detected, the motor 12 will remain without power until the logic power supply 13 output is forced into the LOW state and returned to the HIGH state. This is generally accomplished by temporarily removing the power source from the circuitry 10, but can also be accomplished with this invention by momentarily connecting the output of the logic power supply 13 to the LOW level. For example, the programmed stall detector 32 can consist of an R-S flip flop with the programmed stall detector 32 input connected to a capacitor that is charged by means of a resistance bypassed with a diode. This allows a programmed time delay to be utilized to detect a stalled motor 12. However, movement of the motor 12 will restart the timing cycle of the programmed stall detector 32 because the capacitor will be clamped to ground via the bypass diode during each actual speed generator 16 pulse. The programmed stall detector 32 output provides the appropriate control signal to the motor driver control 30 causing it to cease operation of the motor driver 15 when a stalled motor 12 condition is detected. The programmed stall detector 32 can be reset by a power-up reset control 34. The power-up reset control 34 can be used to produce an output pulse indicative of whether the HIGH state has been applied by the logic power supply 13.

In FIG. 1, the output pulse produced by the power-up reset control 34 can be produced by any suitable means, including connecting a capacitor to the HIGH state in series with a resistor connected to the LOW state. The resistor/capacitor junction is considered to be the power-up reset control 34 output. That output is connected to the programmed stall detector 32 reset input as well as to the speed differential detector 20 input. When the logic power supply 13 creates the HIGH state, the power-up reset control 34 discharged capacitor allows the HIGH state to be momentarily present on the power-up reset control 34 output, and this pulse resets the programmed stall detector 32 and sets the speed differential detector 20. The power-up reset control 34 capacitor then charges through the power-up reset control 34 resistor, allowing the power-up reset control 34 output to return to the LOW state that existed before the logic power supply 13 created the HIGH state.

Having described the invention in detail and by reference to the preferred embodiment thereof, it will be apparent that other modifications and variations are possible without departing from the scope of the invention defined in the appended claims.

What is claimed is:

1. A speed control for an electric motor comprising:
   a tachometer for providing tachometer generated pulses indicative of an actual speed of the electric motor;
   an actual speed generator for receiving the tachometer generated pulses and creating specific width pulses therefrom, each specific width pulse having a leading edge and a trailing edge such that an actual motor speed is determined based on one leading edge of one specific width pulse;
   a desired speed generator for utilizing said leading and said trailing edge of the specific width pulse to initiate and terminate secondary pulses such that the full duration of each said secondary pulse is indicative of a desired speed of the electric motor;
   digital comparison means for continuously comparing said desired speed of the electric motor with said actual speed of the electric motor, and further for providing an error signal indicative of said actual speed as it relates to said desired speed; and
   means for instantaneously adjusting said actual speed of the electric motor to reduce said error signal.

2. A speed control as claimed in claim 1 wherein corresponding edges of said specific width pulse are directly proportional to said actual speed of the electric motor.

3. A speed control as claimed in claim 1 wherein said trailing edge of said specific width pulse commences said secondary pulse.

4. A speed control as claimed in claim 1 wherein said leading edge of said specific width pulse terminates, as required, said secondary pulse.

5. A speed control as claimed in claim 1 further comprising a speed differential detector for utilizing said specific width pulse and said secondary pulse.

6. A speed control as claimed in claim 1 further comprising means for monitoring said specific width pulse to detect a stalled condition of the electric motor.

7. A speed control as claimed in claim 6 wherein said means for monitoring said specific width pulse generates a control signal to prevent operation of the electric motor.

8. A speed control as claimed in claim 7 further comprising means for programming a time from when the electric motor is stalled until said control signal indicating said stalled condition of the electric motor is generated.

9. A speed control as claimed in claim 6 wherein said means for monitoring said specific width pulse comprises a programmed stall detector.

10. A speed control as claimed in claim 5 further comprising means for interpreting said error signal from said speed differential detector and generating a current signal in response thereto to affect the electric motor speed.

11. A speed control as claimed in claim 10 wherein said means for interpreting said error signal comprises a programmed timing control.

12. A speed control as claimed in claim 10 further comprising means for converting said current signal into a proportion signal indicative of a time ratio during which power is to be applied to the electric motor.

13. A speed control as claimed in claim 12 wherein said means for converting said current signal comprises a proportional power control.

14. A speed control as claimed in claim 13 further comprising a means for receiving said proportion signal from said proportional power control and further for converting said proportion signal into a motor driver signal.

15. A speed control as claimed in claim 14 wherein said means for converting said proportion signal into a motor driver signal comprises a motor driver control.

16. A speed control as claimed in claim 1 further comprising a logic power supply capable of a high level output state and a low level output state.

17. A speed control as claimed in claim 16 further comprising a means for producing an output pulse indicative of whether said high level output state is being applied to the speed control.

18. A speed control as claimed in claim 17 wherein said means for producing an output pulse comprises a power-up reset control.

19. A speed control as claimed in claim 1 wherein said means for instantaneously adjusting said actual speed of the electric motor to reduce said error signal further comprises means for programming an adjustment rate.

20. A speed control as claimed in claim 1 further comprising a balanced line sync technique when the electric motor is operating on alternating current.

21. A speed control as claimed in claim 1 further comprising a time portion generator when the electric motor is operating on direct current.

* * * * *